United States Patent
Monro

(10) Patent No.: US 7,570,817 B2
(45) Date of Patent: Aug. 4, 2009

(54) SIGNAL COMPRESSION AND DECOMPRESSION

(75) Inventor: Donald Martin Monro, Beckington (GB)

(73) Assignee: Ayscough Visuals LLC, Las Vegas, NV (US)

( * ) Notice: Subject to any disclaimer, the term of this patent is extended or adjusted under 35 U.S.C. 154(b) by 1428 days.

(21) Appl. No.: 10/333,480

(22) PCT Filed: Jul. 20, 2001

(86) PCT No.: PCT/GB01/03280

§ 371 (c)(1), (2), (4) Date: Jan. 4, 2004

(87) PCT Pub. No.: WO02/13538

PCT Pub. Date: Feb. 14, 2002

(65) Prior Publication Data

US 2004/0126018 A1 Jul. 1, 2004

(30) Foreign Application Priority Data

Aug. 3, 2000 (GB) .................................. 009121.3

(51) Int. Cl.
*G06K 9/36* (2006.01)
(52) U.S. Cl. .................... 382/232; 382/238; 382/240; 382/248
(58) Field of Classification Search ................ 382/232, 382/233, 240, 248; 375/240.08; 708/319, 708/320; 706/13
See application file for complete search history.

(56) References Cited

U.S. PATENT DOCUMENTS

| 4,694,336 | A | | 9/1987 | Keesen et al. | 375/240.03 |
| 5,315,670 | A | | 5/1994 | Shapiro | 382/240 |
| 5,321,776 | A | | 6/1994 | Shapiro | 382/240 |
| 5,764,807 | A | * | 6/1998 | Pearlman et al. | 382/240 |
| 6,023,296 | A | * | 2/2000 | Lee et al. | 375/240.05 |
| 6,100,940 | A | * | 8/2000 | Dieterich | 348/700 |
| 6,266,450 | B1 | * | 7/2001 | Yip et al. | 382/240 |
| 6,411,736 | B1 | * | 6/2002 | Yip et al. | 382/233 |

FOREIGN PATENT DOCUMENTS

| EP | 0905978 A2 | | 3/1999 |
| JP | 10313457 A | * | 11/1998 |
| WO | WO97/21302 | | 6/1997 |
| WO | WO98/37700 | | 8/1998 |
| WO | WO99/08449 | | 2/1999 |
| WO | WO99/57908 | | 11/1999 |

* cited by examiner

*Primary Examiner*—Anh Hong Do
(74) *Attorney, Agent, or Firm*—Woodcock Washburn LLP

(57) ABSTRACT

A method of data compression, for example for image or audio signals, comprises encoding the data using a transform such as a wavelet transform or DCT, and transmitting only a predefined number of the most significant bits for each coefficient. It has been found experimentally that while such a method may marginally decrease the signal to noise ratio, the subjective quality of the received image or audio signal is nevertheless enhanced.

54 Claims, 2 Drawing Sheets

SIGNAL COMPRESSION AND DECOMPRESSION

BACKGROUND OF THE INVENTION

1. Field of the Invention

The present invention relates to methods and apparatus for data compression and decompression, and particularly although not exclusively to such methods and apparatus for compression and decompression of still or video images and/or audio data.

2. Description of Related Art

There are number of known approaches to compressing image and audio data. Examples include the well known Joint Picture Expert Group (JPEG) algorithm for still picture encoding and decoding, and the Moving Picture Expert Group (MPEG) algorithms for encoding and decoding video data. These, together with many other encoding and decoding systems, make use of spatial transforms such as the Discrete Cosine Transform (DCT) to convert the original image data into a compressed form. Other algorithms use alternative transforms such as the Wavelet Transform.

Typically, the output from the chosen transform is a series of transform coefficients which, taken as a whole, define the encoded compressed form of the original data. When the compressed data needs to be transferred across a communications medium such as for example the Internet or a low-bandwidth wireless connection, the coefficients are converted into binary form (bits) which can then be transmitted according to any preferred communications protocol.

In an "embedded" system (using an "embedded quantizer"), the transform coefficients are ordered into layers of significance (bit planes), with the most significant bits normally being transmitted first. With such an "embedded" coding scheme, the recipient initially receives a low-resolution image which as transmission progresses is gradually refined into a higher-resolution image. That gives the recipient the possibility of terminating the transmission at any time once the image that has been received is of sufficient resolution for the recipient's needs.

Most embedded systems make use of the concept of significance-switching, in other words they provide some mechanism for advising the decoder of the position of the most significant bit of each of the coefficients. Without significance-switching, a considerable amount of the available bandwidth would be wasted by repeatedly sending insignificant bits for coefficients in which the first significant bit has not yet been reached. For positive coefficients, this means repeatedly sending zeros when the first significant bit (ie a 1) has not yet been reached. Some systems such as that by Shapiro do this by scanning one bit plane at a time: see Shapiro, IEEE Transactions on Signal Processing, 41(12); 3445 to 3462 December 1993 (further described in U.S. Pat. No. 5,321,776 and U.S. Pat. No. 5,315,670). Others notify the decoder of the most significant bit position by sending it explicitly. Several systems such as those described in documents WO 99/08449 and WO 98/37700 make use of masking techniques to improve bit transmission efficiency.

With all of the above techniques, the most significant bit of each individual coefficient is sent first, followed by successively less significant bits, bit plane by bit pane. When a particular cut-off bit plane is reached, the system considers that no further refinement of the coefficient would be worthwhile, and hence no further bits which may exist below the cut-off bit plane are sent.

BRIEF SUMMARY OF THE INVENTION

The present applicant has realised that a further improvement in efficiency can be achieved by sending only a pre-defined number of bits for each coefficient, after the most significant bit, regardless of which bit plane the relevant bits fall into.

According to a first aspect of the present invention there is provided a method of data compression comprising applying a transform to the data to derive a plurality of transform coefficients each comprising a plurality of bits, and storing or transmitting as compressed data the most significant bits of each coefficient down to a precision limit, the precision limit being determined according to a precision map applied across the coefficients. By means of such an approach the system needs to send fewer bits for the same level of visual/auditory quality. Thus, either data of same perceived quality can be transmitted in a shorter time or alternatively data of a better perceived quality can be transmitted in the same time.

The method is quite general, and is applicable to any method of data compression in which there is some sort of bitwise quantization. The effect of applying the method, in comparison with the prior art, is that the number of bits used/sent for larger coefficients is reduced. This avoids the problem, inherent in the prior art, of sending large amounts of data which does not affect the recipient's perception of the fidelity of the decompressed data. Specifically, when the method is used to compress still or moving images, it avoids sending bits which do not contribute to the perceived quality of the ultimate image. Likewise, when the method is used to compress an audio signal, it avoids sending bits which relate to details that cannot actually be heard.

Preferably, the transform creates coefficients in a plurality of frequency sub-bands, with the precision map defining differing precision limit profiles for different sub-bands. For example, in one preferred embodiment the precision limit is fixed within each sub-band, but with different sub-bands having different limits. A typical prior art transform applied to an audio signal produces a lot of power in some sub-bands which are of little consequence to the listener. This means that a large proportion of the bit budget is wasted refining information that is inaudible. With the present invention, the number of significant bits sent for each sub-band is limited, thus allowing the "saving" of bits for the most audible sub-bands (the choice of which may depend on masking). Similar considerations apply in image/video compression, although of course because of the physical properties of the eye the sub-bands that are of greatest perceptual importance will not necessarily be the same as those for audio.

When the method is applied within a codec, both the coder and the decoder know how many bits of significance are to be sent/expected for each coefficient, typically according to its position in the transform. Thus, a specific "stop" signal does not have to be sent for each coefficient.

The transform used by the method may be any transform that produces coefficients that can be quantized. Examples include the wavelet transform, the discrete cosine transform and the lapped orthogonal transform. When the method is applied to compressing image/video data, the preferred transform is a 5-scale wavelet transform. Preferably, the precision limit (or "refinement depth") for each sub-band is fixed. It has been found in practice that respective precision limits of 2, 2, 3, 3, 5 results in visually lossless output to a confidence level of 90%, when applied to an intra or a still image. It has also been found in practice that for difference or motion-compensated images very restrictive limits can be set, such as 1,1,1, 1,2. These are images that are normally considered very difficult to compress effectively.

It is normally assumed that the importance of a particular bit in a specific coefficient is determined by the bit plane on which it sits. The present invention undermines that assumption and, instead, focuses on improving the quality of the end product by limiting the number of bits which are used to refine each significant coefficient, regardless of the position on the bit planes. Rather than attempting to optimise pixel signal to noise ratio (PSNR), or to rely on modelling of the human visual system, as would be conventional, it is preferred in the present invention to use directly the results of psycho-visual or psycho-auditory experimentation. Specifically, where the precision limit differs between the sub-bands, but is fixed within a particular sub-band, psycho-visual and/or psycho-auditory experiments will determine the preferred precision limits for each band.

The precision map may further be defined at least partially as a function of an image or images to be compressed, and in particular it could make allowances for specific artefacts within an image. When the transform is a block transform creating intra-frames and residual frames, both types of frame may be compressed using the preferred algorithm.

The present invention extends to a coder for carrying out the method and to a codec which includes such a coder.

It will be understood of course that the precision map does not necessarily require individual data points to be stored separately for each possible coefficient. In a simple implementation, for example, the precision limit may be the same for all of the coefficients, and in that case just the chosen value (e.g. 3) needs to be stored and applied to all of the coefficients as they are processed. The fixed value could as suggested in the specific embodiment be stored in a separate precision limit store (e.g. a defined area of random access memory) but it could equally in this example simply be hard-coded into the algorithm.

Likewise, when a fixed precision limit is used for each of the sub-bands, those limits could be stored separately so that they can easily be adjusted or adapted when necessary or they could alternatively be hard-coded into the algorithm. It is only a preferably and not an essential feature that the precision map may be user-adjustable. Also, provision could be made for the precision limit to be automatically adjustable without user intervention. The precision limit or limits to be applied might for example depend upon some measurable characteristics of the image, audio signal or other data that is to be compressed.

BRIEF DESCRIPTION OF THE DRAWINGS

The invention may be carried into practice in a number of ways and one specific embodiment will now be described by way of example, with reference to the accompanying drawings, in which.

DETAILED DESCRIPTION OF THE INVENTION

Figure 1A:
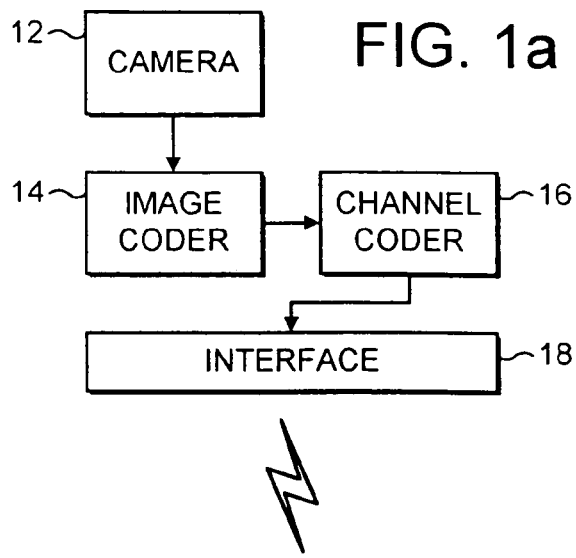
FIG. 1a is a block diagram showing the structure of an encoder incorporating an embodiment of the present invention.
Figure 1B:
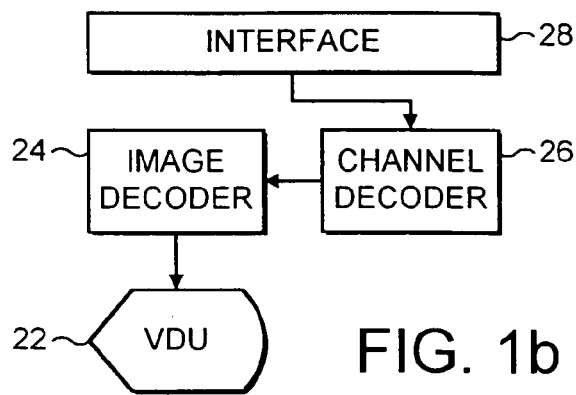
FIG. 1b is a block diagram of a corresponding decoder.

FIGS. 1a and 1b (which are taken from WO 99/08449) show respectively an image transmission system and a receiver for use in conjunction with the preferred embodiment of the present invention.

Turning first to FIG. 1a, a camera 12 (or other image source) supplies an analogue or digital image to an image coder 14 which applies a transform to encode the image as will be described in more detail below. The encoded image is then supplied to a channel coder 16 which provides error protection encoding, before passing on the data to an interface 18. This may take the form of a modem, a wireless antennae or any other communications device which allows the signal to be transmitted onto a communication path such as a radio path, a telephone line or any other type of data transmission channel such as the Internet.

FIG. 1b shows the receiver. The signal is received at an interface 28, and is then sent to a channel decoder 26 which decodes the transmission coding which was originally applied by the transmission coder 16. The signal is then supplied to an image decoder which decodes the compressed image into a form which is suitable for storage or display—eg on a VDU 22. The system shown may comprise a video telephone or video conferencing system, allowing bi-directional transmission of data.

Figure 2A:
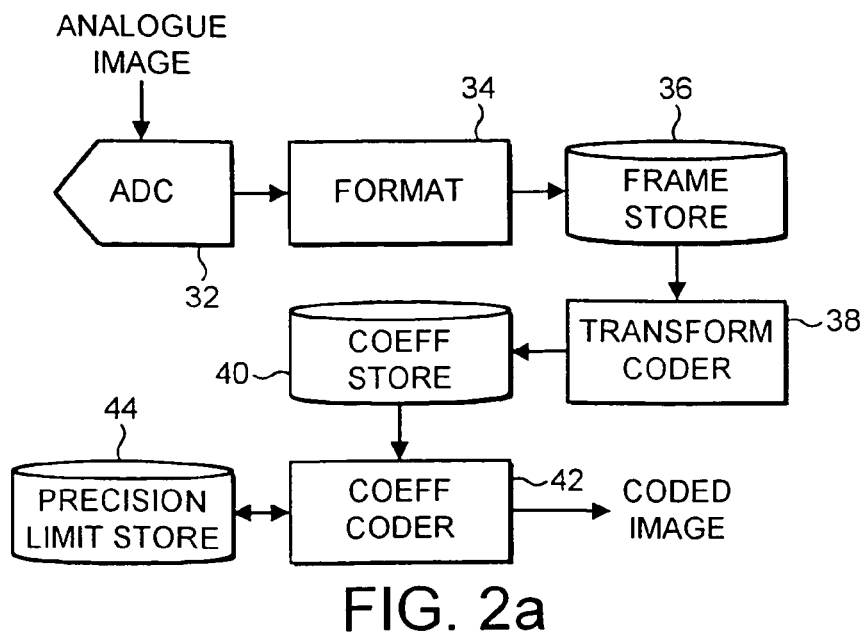
FIG. 2a is a block diagram of the preferred encoder of the present invention.

FIG. 2a illustrates in more detail the image coder 14 of FIG. 1a. The coder is supplied with an input analogue image signal which is digitised by an analogue to digital converter 32, with the resultant stream of samples being formatted into image rows by a formatter 34. These are stored within a frame store 36, this store therefore receiving digitised pixels which correspond to the entire image.

A transform coder 38 then applies a spatial transform to the image within the frame store 36, to generate a set of transform coefficients which are stored within a coefficient store 40. The transform coder may use any convenient transform such as the DCT, wavelet transforms or lapped orthogonal transforms.

Within a coefficient coder 42 the stored coefficients are quantized and manipulated, in dependence upon data stored in a precision limit map store 44, before being transmitted as an output coded image. The algorithms used by the coefficient coder 42 acting in conjunction with the precision limit map store 44 will be discussed in more detail below.

Figure 2B:
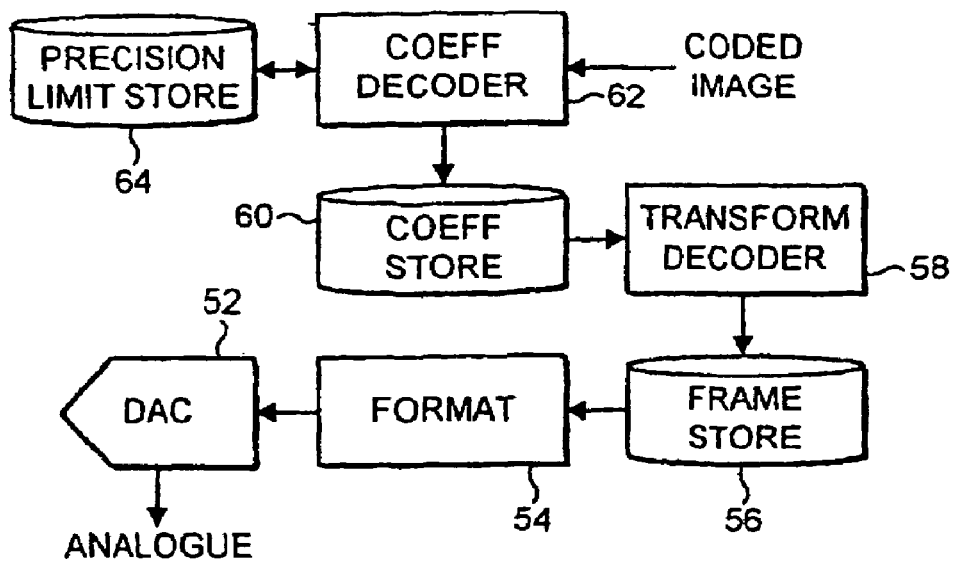
FIG. 2b is a block diagram of the preferred decoder.

Turning now to FIG. 2b, the coded image is first received by a coefficient decoder 62 which acts in conjunction with a further precision limit map store 64 to recreate the transform coefficients. These are written to a receiver coefficient store 60. Thus, after operation of the coefficient decoder 62 on the entire image, the coefficient store 60 contains the values of all of those coefficients which have been received.

The contents of the coefficient store 60 are then supplied to a transform decoder 58 which performs the inverse spatial transform to that carried out by the transform coder 38. The resultant output image is stored within a frame store 56 from which the values are read out, formatted into lines by a formatter 54, and then supplied to a digital to analogue converter 52 to provide the output analogue image signal. The components 60 to 52 correspond to those of a conventional decoder, and mirror the operation of the corresponding components of the encoder shown in FIG. 2a'.

Conveniently, the formatter 54, the transform decoder 58 and the coefficient decoder 62 may all be provided by a single programmed processor such as a microprocessor, micro-controller or digital signal processing device. The frame store, the coefficient store and the precision limit map store may all be provided by a common random access memory device, or other storage device such as a disk drive. The same applies to the corresponding components of the encoder in FIG. 2a.

It may be noted, for reference, that FIGS. 2a and 2b differ from the corresponding figures in WO 99/08499 by the presence of the precision limit map stores 44, 64 and the different algorithms used by the coefficient coder 42 and the coefficient decoder 62.

In prior art systems, such as that disclosed in WO 099/08499, a coefficient coder acting in conjunction with a mask buffer sends the quantized coefficient bits, bit plane by bit plane, from the most significant bit (MSB) to the least significant bit (LSB).

Figure 3A:
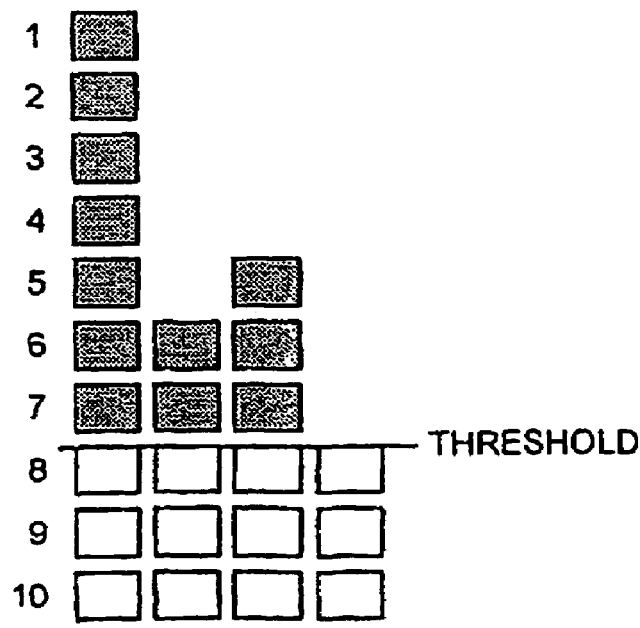
FIG. 3a shows a series of coefficients that have been refined to a predefined threshold level, as in the prior art.

This is illustrated in more detail in FIG. 3a, which shows four quanitized coefficients extending over a total of ten bit planes. The MSB in each case is at the top of the Figure, and the LSB at the bottom. For each coefficient, all of the bits are sent between the MSB and a threshold value defined by the mask. Bits which fall beneath the predefined threshold (in this example bits falling below bit plane 7) are not sent.

Figure 3B:
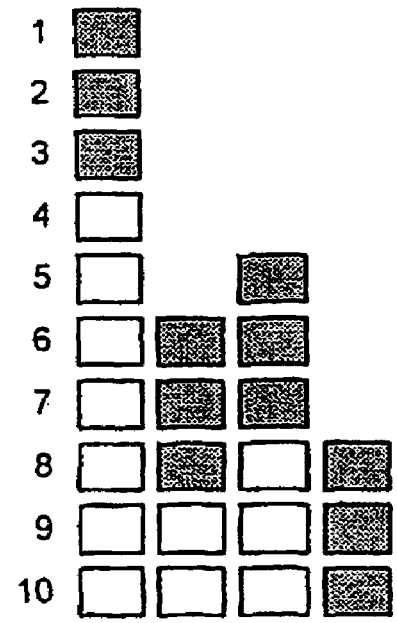
FIG. 3b shows the same coefficients which have been refined to a fixed depth in accordance with the preferred embodiment of the present invention.

In the preferred embodiment of the invention, the fixed threshold value may be dispensed with and instead for each coefficient a predefined number of bits are sent after the MSB, regardless of the bit planes that these fall into. This is illustrated in FIG. 3b which shows, as an example, the first three significant bits of each coefficient being sent. It will be noted that by omitting to send the fourth to the seventh significant bits in the first coefficient, space has been made available without increasing the bit budget to send four bits that were originally below the cut-off threshold. Indeed, the fourth coefficient in FIGS. 3a and 3b which was not sent at all in the prior art system has in this embodiment been sent in its entirety. It has been found, unexpectedly, that this fourth coefficient lying entirely beneath the threshold value actually contributes more to the visual appearance of the ultimate image than did the bits of lower significance within the first coefficient.

It has been found in practice that sending coefficients to a fixed depth of three generally provides an output image of acceptable visual quality. Although the pixel signal to noise ratio (PSNR) may be slightly reduced when compared with the system of WO 99/08499, subjective visual quality—as ascertained with psycho-visual testing—is enhanced.

The example shown in FIG. 3b corresponds to a prevision limit map stored within the precision limit map store 44 which tells the coefficient coder 42 to send each coefficient to a fixed depth of three. The coefficient map may however be rather more sophisticated, and may provide for different depths to be sent for different coefficients. More generally, the precision limit map instructs the coefficient coder how to operate on every coefficient within the output space of the particular transform that is being used by the transform coder 38. Where the transform works by dividing the information up into frequency sub-bands (as for example with DCT or wavelet transforms), the precision limit map may cause the coefficient coder to act differently on coefficients falling within the different sub-bands. For example, in some of the bands the first three significant bits may be sent, whereas in some other sub-bands only the first two bits may be sent. This amounts, effectively, to weighting the amount of information that is transmitted in the different sub-bands.

A unique feature of significance switching in embedded quantizers is that the most significant bit of every coefficient is known before any refinement (that is the transmission of subsequent bits) takes place. That allows the quantization level to be adapted, if necessary, for every individual coefficient.

The depth to be sent for each coefficient may also if desired be adjusted based on spatial factors—for example coefficients which arise from particular artefacts within the original image. It might for example be useful to send information to a greater depth on coefficients which arise from isolated pixels or small groups of pixels within the original image. More generally, one could adjust the number of bits to be sent according to spatial position and/or context.

When used in conjunction with a block-based encoding scheme for the transmission of video information, the precision limit map may be used to adjust not only the information transmitted for the intra-frames, but also for the residuals.

Although FIGS. 3a and 3b display the use of a threshold bit plane and the use of predefined depths as alternatives, there is no reason why they could not if appropriate be combined. In such an arrangement all of the most significant bits for a particular coefficient would be sent, down to a predefined depth, unless any of those bits fell beneath a predefined threshold bit plane, in which case they would not be sent.

The present invention is applicable not only to the transmission of still and moving images, but also to the transmission of audio signals. In the preferred audio system, the input analogue signal is digitized and then compressed by any convenient transform such as the wavelet transform. The precision limit map will typically define the precision limit to be used for each audio sub-band, although variable precision within each sub-band could also be possible depending upon the characteristics of the audio system. This could be achieved either by modelling the known characteristics of the human ear or alternatively by direct psycho-auditory experiments.

In an audio environment, of course, the frame stores 36,56 and the formatters 34,54 in FIGS. 2a and 2b are omitted, and the inputs and outputs are audio signals rather than image signals.

The invention in its most general form is not restricted to the transmission of image and/or audio data. Generally, whatever the data to be sent in encoded form, whenever there is quantization only a limited number of the most significant bits of a coefficient need to be sent before further refinement of the coefficient becomes imperceptible to the recipient.

In any situation which makes use of a quantizer (for example a linear quantizer), some of the quantized bits can be ignored and/or not sent since they are not visually significant. For example, the JPEG Image Compression System often sends a large amount of low precision information which is not visually significant. By applying the present invention, one could shorten many of the symbols used in the Huffman JPEG table, some of them by many bits. Applying the precision limits selectively to coefficients of different frequency would often reduce the number of bits sent without visible degradation of the image. Thus, one achieves greater compression; alternatively, at a greater compression ratio the codec would be able to use more coefficients, thus giving better quality.

In any Huffman or other run-length coding system, the number of independent symbols required may be reduced. If for example five bits of precision are required (as in the low frequency coefficients of either a DCT or a wavelet transform) then quantized values of magnitude 0-31 require five bits of precision, which is normal. However, above magnitude 32, five bits still only need be sent, in contrast with the prior art.

In practice, the difference between magnitude 32 and magnitude 33 is indistinguishable, as is the difference between 34 and 35, and so on. More generally, symbols only need to be provided for the even numbers for magnitudes between 32 and 62. Above magnitude 64, only every fourth number needs to be used, and so on. There are fewer distinct run-time symbols required which normally gives rise to a lower entropy and greater efficiency.

The invention claimed is:

1. A method of data compression comprising:
   applying a transform to the data to derive a plurality of transform coefficients each comprising a plurality of bits;
   determining a most significant bit for each coefficient; and
   storing or transmitting as compressed data without leading zeros, the most significant bit of each coefficient and subsequent bits down to a pre-defined number of bits that specifies, for each coefficient, an identical number of bits to be stored or transmitted.

2. A method of data compression according to claim 1 in which the transform creates coefficients in a plurality of frequency sub-bands, the pre-defined number of bits being a fixed number of bits within each of the sub-bands.

3. A method of data compression according to claim 1 in which the transform is a wavelet transform.

4. A method of data compression according to claim 1 in which the transform is a discrete cosine transform.

5. A method of data compression according to claim 1 in which the transform is a lapped orthogonal transform.

6. A method of data compression according to claim 1 in which the pre-defined number of bits is determined experimentally according to the perceived quality of data derived from a test range of compressed data.

7. A method of data compression according to claim 1 in which the data to be compressed is representative of a sequence of images.

8. A method of data compression according to claim 1 in which the determining step comprises psycho-visual experimentation.

9. A method of data compression according to claim 1 in which the determining step comprises psycho-auditory experimentation.

10. A method of data compression according to claim 1 in which the pre-defined number of bits is defined at least partially as a function of the image.

11. A method of data compression according to claim 7 in which the transform is a block transform and creates intra-frames and residual frames.

12. A method of data compression according to claim 11 in which the data to be compressed comprises the intra-frames.

13. A method of data compression according to claim 11 in which the data to be compressed comprises the residual frame.

14. A method of data compression according to claim 1 in which the pre-defined number of bits is hard-coded.

15. A method of data compression according to claim 1 in which the pre-defined number of bits is user-adjustable.

16. A method of data compression according to claim 1 in which the pre-defined number of bits is adjustable under program control.

17. A coder for carrying out the method of claim 1.

18. A codec including a coder as claimed in claim 17.

19. A method of data compression according to claim 1 in which the data to be compressed is representative of a still image.

20. A method of data compression according to claim 1 in which the data to be compressed is representative of audio information.

21. A computer-readable medium having stored thereon computer-executable instructions for performing steps comprising:
   applying a transform to data to derive a plurality of transform coefficients each comprising a plurality of bits;
   determining a most significant bit for each coefficient; and
   storing or transmitting as compressed data without leading zeros, the most significant bit of each coefficient and subsequent bits down to a pre-defined number of bits that specifies, for each coefficient, an identical number of bits to be stored or transmitted.

22. The computer-readable medium of claim 21, wherein the transform creates coefficients in a plurality of frequency sub-bands, the pre-defined number of bits being a fixed number of bits within each of the sub-bands.

23. The computer-readable medium of claim 21, wherein the transform is a wavelet transform.

24. The computer-readable medium of claim 21, wherein the transform is a discrete cosine transform.

25. The computer-readable medium of claim 21, wherein the transform is a lapped orthogonal transform.

26. The computer-readable medium of claim 21, wherein the pre-defined number of bits is determined experimentally according to the perceived quality of data derived from a test range of compressed data.

27. The computer-readable medium of claim 21, wherein the data to be compressed is representative of a still image.

28. The computer-readable medium of claim 21, wherein the data to be compressed is representative of a sequence of images.

29. The computer-readable medium of claim 21, wherein the data to be compressed is representative of audio information.

30. The computer-readable medium of claim 27, wherein the determining step comprises psycho-visual experimentation.

31. The computer-readable medium of claim 29, wherein the determining step comprises psycho-auditory experimentation.

32. The computer-readable medium of claim 27, wherein the pre-defined number of bits is defined at least partially as a function of the image.

33. The computer-readable medium of claim 28, wherein the transform is a block transform and creates intra-frames and residual frames.

34. The computer-readable medium of claim 33, wherein the data to be compressed comprises the intra-frames.

35. The computer-readable medium of claim 33, wherein the data to be compressed comprises the residual frame.

36. The computer-readable medium of claim 21, wherein the pre-defined number of bits is hard-coded.

37. The computer-readable medium of claim 21, wherein the pre-defined number of bits is user-adjustable.

38. The computer-readable medium of claim 21, wherein the pre-defined number of bits is adjustable under program control.

39. An encoder comprising:
   a transform coder that applies a transform to data to derive a plurality of transform coefficients each comprising a plurality of bits; and a coefficient coder that identifies a most significant bit of each coefficient and subsequent bits down to a pre-defined number of bits that specifies, for each coefficient, an identical number of bits to be stored or transmitted.

40. The encoder of claim 39, wherein the transform creates coefficients in a plurality of frequency sub-bands, the pre-defined number of bits being a fixed number of bits within each of the sub-bands.

41. The encoder of claim 39, wherein the transform is a wavelet transform.

42. The encoder of claim 39, wherein the transform is a discrete cosine transform.

43. The encoder of claim 39, wherein the transform is a lapped orthogonal transform.

44. The encoder of claim 39, wherein the pre-defined number of bits is determined experimentally according to the perceived quality of data derived from a test range of compressed data.

45. The encoder of claim 39, wherein the data is representative of a still image.

46. The encoder of claim 39, wherein the data is representative of a sequence of images.

47. The encoder of claim 39, wherein the data is representative of audio information.

48. The encoder of claim 45, wherein the pre-defined number of bits is defined at least partially as a function of the image.

49. The encoder of claim 46, wherein the transform is a block transform and creates intra-frames and residual frames.

50. The encoder of claim 49, wherein the data comprises the intra-frames.

51. The encoder of claim 49, wherein the data comprises the residual frame.

52. The encoder of claim 39, wherein the pre-defined number of bits is hard-coded.

53. The encoder of claim 39, wherein the pre-defined number of bits is user-adjustable.

54. The encoder of claim 39, wherein the pre-defined number of bits is adjustable under program control.

* * * * *